US012189338B2

(12) United States Patent
Hernandez et al.

(10) Patent No.: US 12,189,338 B2
(45) Date of Patent: Jan. 7, 2025

(54) ELASTIC HOLDING MEMBER FOR FIXING A TIMEPIECE COMPONENT ON DIFFERENT SUPPORT ELEMENTS

(71) Applicant: Nivarox-FAR S.A., Le Locle (CH)

(72) Inventors: Ivan Hernandez, Cressier (CH); Pierre Cusin, Villars-Burquin (CH)

(73) Assignee: Nivarox-FAR S.A., Le Locle (CH)

( * ) Notice: Subject to any disclaimer, the term of this patent is extended or adjusted under 35 U.S.C. 154(b) by 563 days.

(21) Appl. No.: 17/442,503

(22) PCT Filed: Apr. 6, 2020

(86) PCT No.: PCT/EP2020/059815
§ 371 (c)(1),
(2) Date: Sep. 23, 2021

(87) PCT Pub. No.: WO2020/207986
PCT Pub. Date: Oct. 15, 2020

(65) Prior Publication Data
US 2022/0155728 A1 May 19, 2022

(30) Foreign Application Priority Data
Apr. 8, 2019 (EP) .................................... 19167903

(51) Int. Cl.
*G04B 17/34* (2006.01)

(52) U.S. Cl.
CPC .................................. *G04B 17/345* (2013.01)

(58) Field of Classification Search
CPC ............................ G04B 17/345; G04B 13/022
(Continued)

(56) References Cited

U.S. PATENT DOCUMENTS

2008/0112274 A1* 5/2008 Bitterli ................. G04B 13/022 368/238
2008/0113154 A1* 5/2008 Bitterli ................. G04B 13/021 428/131
(Continued)

FOREIGN PATENT DOCUMENTS

CH 698 837 B1 11/2009
CH 707288 A1 * 5/2014 ........... G04B 17/345
(Continued)

OTHER PUBLICATIONS

Office Action issued Mar. 17. 2022 in corresponding Indian Patent Application No. 202147045389 (with English Translation), 7 pages.
(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A holding member for fixing a timepiece component on support elements of different cross section includes an opening into which each support element can be inserted, the holding member having structural elements together forming a body configured to ensure mounting of each support element in the opening. Each of the structural elements includes a first structural sub-element and a second structural sub-element, the first structural sub-element including a volume of material greater than a volume of material constituting the second structural sub-element. The holding member includes a connecting portion ensuring the mounting of each of the support elements in the holding member, the portion being defined on an inner face of the first structural sub-element.

26 Claims, 2 Drawing Sheets

(58) Field of Classification Search
USPC .......................................................... 368/127
See application file for complete search history.

(56) References Cited

U.S. PATENT DOCUMENTS

| | | | | |
|---|---|---|---|---|
| 2012/0106303 | A1 | 5/2012 | Von Gunten et al. | |
| 2014/0254330 | A1 | 9/2014 | Von Gunten et al. | |
| 2014/0254331 | A1 | 9/2014 | Von Gunten et al. | |
| 2015/0023140 | A1 * | 1/2015 | Daout | G04B 1/145 368/177 |
| 2018/0107162 | A1 * | 4/2018 | Hernandez | G04B 17/345 |

FOREIGN PATENT DOCUMENTS

| | | | | |
|---|---|---|---|---|
| CH | 711 213 | A2 | 12/2016 | |
| CN | 103869677 | A | 6/2014 | |
| CN | 103930837 | A | 7/2014 | |
| CN | 108121190 | A * | 6/2018 | B81C 3/001 |
| EP | 3 309 625 | A1 | 4/2018 | |
| EP | 3 401 740 | A1 | 11/2018 | |
| JP | 2013-624163 | A | 6/2013 | |
| JP | 2018-63250 | A | 4/2018 | |
| WO | WO 2011/026725 | A1 | 3/2011 | |
| WO | WO 2011/116486 | A1 | 8/2011 | |

OTHER PUBLICATIONS

Combined Chinese Office Action and Search report issued May 7, 2022 in Chinese Patent Application No. 202080027341.1 (with English Translation of Categories of Cited Documents), 10 pages.
International Search Report mailed on Jul. 10, 2020 in PCT/EP2020/059815 filed on Apr. 6, 2020 (2 pages).
Japanese Office Action Issued Nov. 8, 2022 in Japanese Patent Application No. 2021-557529 (with English translation), 11 pages.

* cited by examiner

1

ELASTIC HOLDING MEMBER FOR FIXING A TIMEPIECE COMPONENT ON DIFFERENT SUPPORT ELEMENTS

FIELD OF THE INVENTION

The invention relates to an elastic holding member for fixing a timepiece component on support elements of different types such as a balance shaft or a stub axle.

The invention also relates to an elastic holding member-timepiece component assembly and assemblages comprising such an assembly and a support element.

Finally, the invention relates to a horological movement comprising at least one of these assemblages as well as to a timepiece comprising such a movement.

BACKGROUND OF THE INVENTION

In the prior art, elastic holding members are known such as timepiece collets which participate in assemblages of spirals on shafts or balance axles of regulating members such as resonators of horological movements, by elastic clamping. Such spirals are conventionally each wound around a spiral axis while being provided with a collet at their inner end. This collet includes an opening, the inner face of which comprises holding parts which are arranged to cooperate with a shaft of revolution about said spiral axis, contributing to the centring of said spiral on such a shaft.

Before making such assemblages, it is common to carry out measurements of the torque and/or stiffness of these spirals, in particular during an operation called classification operation. For this purpose, the collet of a given spiral is then driven on a stub axle of circular cross section which helps to ensure that it is held in an angular and vertical position. The diameter of this stub axle is defined according to the diameter of the opening of the spiral collet, so that holding this collet in angular and vertical position, when measuring the torque of the spiral, is obtained by clamping this collet on this stub axle. Such clamping, which results from the elastic deformation of the collet, has a value defined according to the diameter of the stub axle. Subsequently, once the classification operation has been completed, the spiral collet is then separated/released from the stub axle in order to be assembled by driving it onto the balance shaft so that the parts holding the balance collet cooperate with this balance shaft in order to ensure elastic clamping.

However, such a classification operation can be at the origin of "product defects" due to the fact that it happens that the collet breaks/crumbles during multiple and repetitive stresses related to its driving, release on/from the stub axle and then a "re-driving" on the balance shaft, or else during the operation of the resonator wherein it is comprised, in particular during the movement. Indeed, during the classification operation, the clamping carried out between the stub axle and the collet causes shearing forces which can damage this collet by causing micro-breaks at least at one edge of this collet. In other words, driving this collet, conventionally made of a very fragile material under mechanical stress such as silicon, on the stub axle can generate tensions in the material of this spiral and generate a risk of crumbling which can turn out to be very critical because inducing the starting point of rupture at the collet with a risk of breakage thereof which will be detected later when it is moved.

SUMMARY OF THE INVENTION

The purpose of the present invention is to alleviate all or part of the disadvantages mentioned above by providing an elastic holding member comprising several specific holding parts each provided to cooperate exclusively with a given type of support element and in particular with the peripheral wall of this support element when mounting this member on the latter.

To this end, the invention relates to an elastic holding member for fixing a timepiece component on support elements of different cross section, comprising an opening into which each support element can be inserted, the holding member including structural elements together forming the body of this holding member and helping to ensure mounting of each support element in said opening each of these structural elements comprising a first structural sub-element and a second structural sub-element, the first structural sub-element including a volume of material greater than the volume of material constituting the second structural sub-element, the holding member comprising a connecting portion ensuring the mounting of each of said support elements in the holding member, said portion being defined on an inner face of said first structural sub-element.

Thus in this holding member the same connecting portion of a first structural sub-element of each structural element of the holding member thanks to its features, is stressed both during the mounting of this member on the stub axle and when driving said member onto a support element such as the balance shaft, regardless of the geometric shape of the cross section of this support element. In addition, the connecting portions of the first structural sub-elements of such a holding member allow to assemble this member on the stub axle by carrying out a fitting and a coupling of this holding member with this stub axle, without this mounting requiring a driving operation as is the case in the prior art. This fitting provides for the positioning of this holding member in an angular and vertical position on the stub axle, in particular when measuring the torque of a spiral, without elastic clamping, that is to say without deformation of the structural elements, namely without deformation of this holding member. In other words, such a coupling between the holding member and the stub axle necessary for carrying out the classification operation, is obtained without elastic clamping, thanks in particular to the complementarity of their shape which thus allows cooperation between the latter when they are rotated when performing the classification operation, and also thanks to the distribution of the volume/amount of material between the first and second structural sub-elements of each structural element constituting this holding member. It is therefore understood that when performing a classification operation, the holding member is no longer stressed by shear forces which can damage it by causing micro-breaks in its structure.

In other embodiments:

- the connecting portion is defined only on the inner face of said first structural sub-element;
- the connecting portion comprises first and second holding parts ensuring the mounting of each of said support elements in the holding member;
- said first and second holding parts each comprise at least one contact area configured to cooperate with the corresponding support element;
- at least one contact area of the first and second holding parts is comprised in the connecting portion of each first structural sub-element of the holding member, extending over all or part of a thickness of this holding member;
- each contact area of the first and second holding parts is able to cooperate with a corresponding contact portion of the corresponding support element by being in a contact configuration of the plano-convex type;

the first holding part comprises two convex contact areas delimiting a connecting portion of each first structural sub-element;

the second holding part comprises two flat contact areas distributed disjointly over a connecting portion of each first structural sub-element between the two contact areas of the first holding part;

the two flat contact areas of the second holding part of each first structural sub-element are respectively comprised in different planes together forming an obtuse angle;

the second holding part of each first structural sub-element comprises a single flat contact area arranged equidistant from the two convex contact areas of the first holding part;

the holding member comprises as many first structural sub-elements as second structural sub-elements;

the first structural sub-elements and the second structural sub-elements are arranged successively and alternately in the holding member;

each first structural sub-element is connected at its two opposite ends to two second different structural sub-elements;

each second structural sub-element has a cross section which is less than a cross section of each first structural sub-element;

each second structural sub-element has a cross section which is constant throughout the body of this second structural sub-element;

the holding member comprises a point of attachment with the timepiece component;

the holding member is a collet for fixing the timepiece component such as a spiral to a support element such as a balance shaft or a stub axle;

the holding member is made of a micromachinable material comprising silicon, quartz, corundum, silicon and silicon dioxide, DLC, metallic glass, ceramic or any other at least partially amorphous material, or the like.

The invention also relates to an elastic holding member-timepiece component assembly for a horological movement of a timepiece comprising a holding member.

Advantageously, this assembly is made in one piece.

The invention also relates to an assemblage comprising an elastic holding member-timepiece component assembly and a support element, in particular a stub axle, said assembly being held on said support element from a first holding part of said holding member, said first holding part being configured to cooperate with a peripheral wall of said support element.

In particular, the assemblage comprises an elastic holding member-timepiece component assembly and a support element, in particular a balance shaft, said assembly being held on said support element from a second holding part of said holding member, said second holding part being configured to cooperate with a peripheral wall of said support element.

The invention also relates to a horological movement comprising at least one such assemblage.

The invention also relates to a timepiece comprising such a horological movement.

BRIEF DESCRIPTION OF THE DRAWINGS

Other features and advantages will emerge clearly from the description which is given below, in an indicative and non-limiting manner, with reference to the appended drawings, wherein.

DETAILED DESCRIPTION OF THE PREFERRED EMBODIMENTS

FIGS. 1 to 4 show an embodiment of the elastic holding member 1 for fixing a timepiece component 2 on a support element 3*a*, 3*b*. By way of example, the elastic holding member 1 can be a collet for fixing the timepiece component 2 such as a spiral to a support element 3*a*, 3*b* such as a "stub axle" 3*a* and a balance shaft 3*b* visible respectively in FIGS. 1 and 2. This stub axle 3*a* also called adjustment axle, stub shaft or classification axle is specifically used in the context of adjustment of a balance-spring assembly according to different known techniques such as the technique called omega-metric technique consisting in carrying out a classification of the spirals, a classification of the balances, a pairing of a balance selected in a particular class, with a spiral also selected in a particular class, these classes being compatible with each other.

It should be noted that with regard to the balance shaft 3*b*, it can also be called by its synonym the balance axle and is in particular designed to receive the collet.

This elastic holding member 1 is made of a material called "fragile" material, preferably a micromachinable material. Such material may comprise silicon, quartz, corundum, silicon and silicon dioxide, DLC, metallic glass, ceramic, other at least partially amorphous material, or the like.

Figure 5:
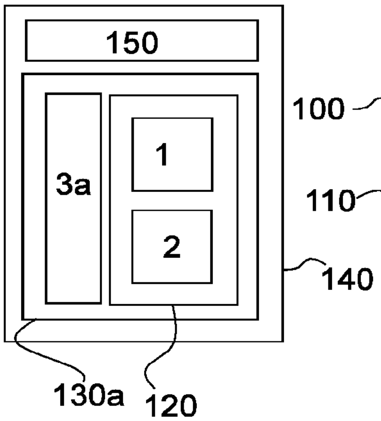
FIG. 5 shows an assemblage including an elastic holding member-timepiece component assembly fixed to a support element such as a stub axle comprised in a device for performing a classification operation, according to the embodiment of the invention.
Figure 6:
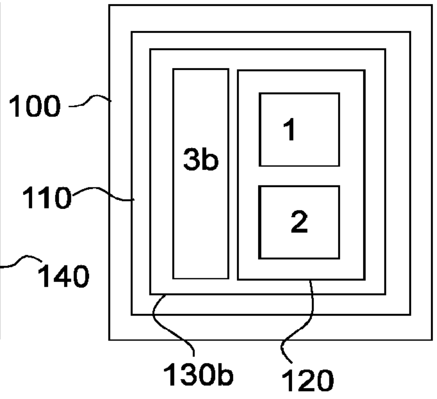
FIG. 6 shows a timepiece comprising a horological movement provided with at least one assemblage including an elastic holding member-timepiece component assembly fixed to a support element such as a balance shaft, according to the embodiment of the invention.

In this embodiment, this holding member 1 can be comprised in an elastic holding member-timepiece component assembly 120 visible in FIGS. 5 and 6. Such an assembly 120 is intended to be arranged in a horological movement 110 of a timepiece 100 visible in FIG. 6, and also to be driven on a support element 3*a* such as the balance shaft or to be placed on a support element 3*b* such as the stub axle when carrying out a classification operation. Such an assembly 120 can be made in one piece and be made of a "fragile" material similar to that of the collet.

It will be noted that in a variant of this assembly 120, only the elastic holding member 1 can be made of such a material called “fragile” material, the timepiece component 2 then being made of another material.

This assembly 120 can form part of an assemblage 130*a*, 130*b* for the horological movement 110 or else for a device 140 for performing a classification operation, by being mounted on the support element 3*a*, 3*b*, here the balance shaft or the stub axle. Such a device 140 visible in FIG. 5, comprises in particular a measuring module 150 and the support element 3*a* here the stub axle 3*a*. It will be noted that this assemblage 130*a*, 130*b* was designed for applications in the watchmaking field. However, the invention can perfectly be implemented in other fields such as aeronautics, jewelry, or else automotive.

Such a holding member 1 comprises outer and inner structures 4*a*, 4*b* as well as an upper face and a lower face 12 which are preferably flat, both of which are respectively comprised in first and second planes P1 and P2. These outer and inner structures 4*a*, 4*b* called hereinafter outer and inner peripheral walls 4*a*, 4*b* respectively delimits the outer and inner contours of this holding member 1, the inner contour defining an opening 5 of this holding member. The outer and inner peripheral walls 4*a*, 4*b* define different shapes of the holding member 1. This holding member 1 has a thickness which extends from the upper face to the lower face 12. As mentioned above, this holding member 1 may correspond to any type of collet, comprising arms 6 each including an elastic sub-arm or rigid and elastic sub-arms 7*a*, 7*b*. These arms 6 are hereinafter called “structural elements 6” of this holding member 1. Such structural elements 6 together form the body of this holding member 1. Indeed, each structural element 6 comprises a portion of the outer and inner peripheral walls 4*a*, 4*b* as well as a portion of the upper and lower faces 12. These structural elements 6 are preferably solid. In other words, these structural elements 6 are preferably not hollow. Under these conditions, the rigid sub-arms 7*a* and the elastic sub-arms 7*b* are hereinafter called respectively first structural sub-elements 7*a* and second structural sub-elements 7*b*.

The outer peripheral wall 4*a* of such a holding member 1 may have any shape, for example being essentially triangular, circular or even a shape similar to that of a quadrilateral. As previously mentioned, the inner peripheral wall 4*b* of this holding member 1 participates in defining the opening 5 of this holding member 1 into which the support element 3*a*, 3*b* is intended to be inserted. This opening 5 defines a volume in the holding member 1 which is smaller than that of a connecting part of one end of the support element 3*a*, 3*b* which is intended to be arranged therein. It will be noted that this connecting part comprises all or part of the portions 10 defined on the peripheral wall 21 of the support element 3*a*, 3*b* and which are intended in particular to cooperate with specific and/or dedicated first and second holding parts 20*a*, 20*b* of the structural elements 6. These first and second holding parts 20*a*, 20*b* are each intended to ensure mounting of said holding member 1 on different support elements 3*a*, 3*b* here a balance shaft and a stub axle. As will be seen below, these first and second holding parts 20*a*, 20*b* each comprise at least one contact area 8*a*, 8*b* configured to cooperate with the corresponding support element 3*a*, 3*b*. Each contact area 8*a*, 8*b* of the first and second holding parts 20*a*, 20*b* is able to cooperate with a corresponding contact portion 10 of the corresponding support element 3*a*, 3*b* by being preferably in a contact configuration of the plano-convex type.

As regards the outer peripheral wall 4*a*, it is in particular intended to be connected to the timepiece component 2 by means of at least one attachment point 11 arranged in the outer peripheral wall of the holding member 1.

For a better understanding, the invention will be described below for a holding member 1 such as a collet illustrated in FIGS. 1 to 4, comprising structural elements 6 each including a first structural sub-element 7*a* and a second structural sub-element 7*b*. This holding member 1 comprises an inner surface 4*b* having a generally hexagonal shape comprising parts having convex shapes. Each of these parts is comprised in a connection area 9 connecting a second structural sub-element 7*b* to a first structural sub-element 7*a*. The inner peripheral wall 4*b* of this holding member 1 has a non-triangular shape. It will be noted that the connecting part comprises all or part of the portions 10 defined on the peripheral wall 21 of the support element 3*a*, 3*b* and which are intended in particular to cooperate with specific and/or dedicated first and second holding parts 20*a*, 20*b* of the first structural sub-elements 7*a*.

This holding member 1 therefore comprises the first structural sub-elements 7*a* and second structural sub-elements 7*b* connecting the outer and inner peripheral walls 4*a*, 4*b* to one another. It will be noted that this holding member 1 comprises as many first structural sub-elements 7*a* as there are second structural sub-elements 7*b*. The first structural sub-elements 7*a* are here undeformable or almost undeformable and play a role of stiffening elements of the holding member 1. As regards the second structural sub-elements 7*b*, they have elasticity properties in particular in comparison of the first structural sub-elements 7*a*. Indeed, these second sub-elements 7*b* are able to deform mainly in tension but also in torsion. These first structural sub-elements 7*a* and these second structural sub-elements 7*b* are defined or even distributed successively and alternately in this holding member 1. In other words, these first structural sub-elements 7*a* are interconnected by said second structural sub-elements 7*b*. More specifically, each second structural sub-element 7*b* is connected at its two opposite ends at connection areas 9 to two different first structural sub-elements 7*a*. As already mentioned previously, such first and second structural sub-elements 7*a*, 7*b* comprise in a non-limiting and non-exhaustive manner:

- inner faces comprised in the inner peripheral wall 4*b* and which also participate in defining the opening 5 of this holding member 1, and
- outer faces comprised in the outer peripheral wall 4*a* of this holding member 1.

It will be noted that the inner faces of the second structural sub-elements 7*b* are essentially flat and the inner faces of the first structural sub-elements 7*a* may be non-flat, for example being corrugated. In this context, the inner face of each first structural sub-element 7*a* comprises a connecting portion 19 provided with first and second holding parts 20*a*, 20*b* visible in FIG. 4 and which are intended for mounting said holding member 1 respectively on support elements 3*a*, 3*b* each having a different cross section. Note that this connecting portion 19 is also called “mounting portion 19” or else “assemblage portion 19”.

These first and second holding parts 20*a*, 20*b* which can also be called “mounting parts” or “assemblage parts” or else “connecting parts”, are comprised in a connecting portion 19 of each first structural sub-element 7*a*, said portion 19 being included in the inner face of the holding member 1 extending over all or part of the thickness of this holding member 1. In other words, each first and second retaining part 20*a*, 20*b* therefore extends over all or part of the thickness of the holding member 1.

The first and second holding parts 20*a*, 20*b* each comprise at least one area 8*a*, 8*b* of contact with the corresponding support element 3*a*, 3*b*. Each contact area 8*a*, 8*b* can be rounded or convex or else flat. The contact area 8*a*, 8*b* of each first and second holding parts 20*a*, 20*b*, is able to cooperate with the peripheral wall 21 of a connecting part of the support element 3*a*, 3*b* in particular with a corresponding contact portion 10 defined in this peripheral wall 21, by being in a contact configuration of the plano-convex type.

These first structural sub-elements and these second structural sub-elements 7*a*, 7*b* connect the outer and inner peripheral walls 4*a*, 4*b* of the holding member 1 to each other. In this holding member 1, these first and second structural and elastic sub-elements 7*a*, 7*b* essentially allow to achieve a coupling of the elastic clamping type of the support element 3*a*, 3*b* in the opening 5 made in this holding member 1 which is defined by the inner peripheral wall 4*b* of this holding member 1.

As already seen, these first structural sub-elements 7*a* therefore comprise only the contact areas 8*a*, 8*b* of the holding member 1 with the support element 3*a*, 3*b* which can be defined in all or part of the connecting portion 19 of each first structural sub-element 7*a*.

In this context, the first holding part 20*a* comprises at least one contact area 8*a*. This first holding part 20*a* is intended to cooperate with the peripheral wall 21 of the support element 3*a*, for example here the stub axle 3*a*. Such a support element 3*a* has a cross section different from that of another support element 3*b* such as the shaft 3*b*, the peripheral wall of which is intended to cooperate only with the second holding part 20*b* of each first structural sub-element 7*a* of the holding member 1. The difference(s) of this cross section may relate to the shape of this section, in particular its geometric shape, but not exclusively.

It will be noted that, the shape and/or the dimensions of this section are specifically defined so that said at least one contact area 8*a* is the only contact area 8*a* of the connecting portion 19 of each first structural sub-element 7*a* which is configured to cooperate exclusively with the peripheral wall 21 of this support element 3*a*.

Figure 1:
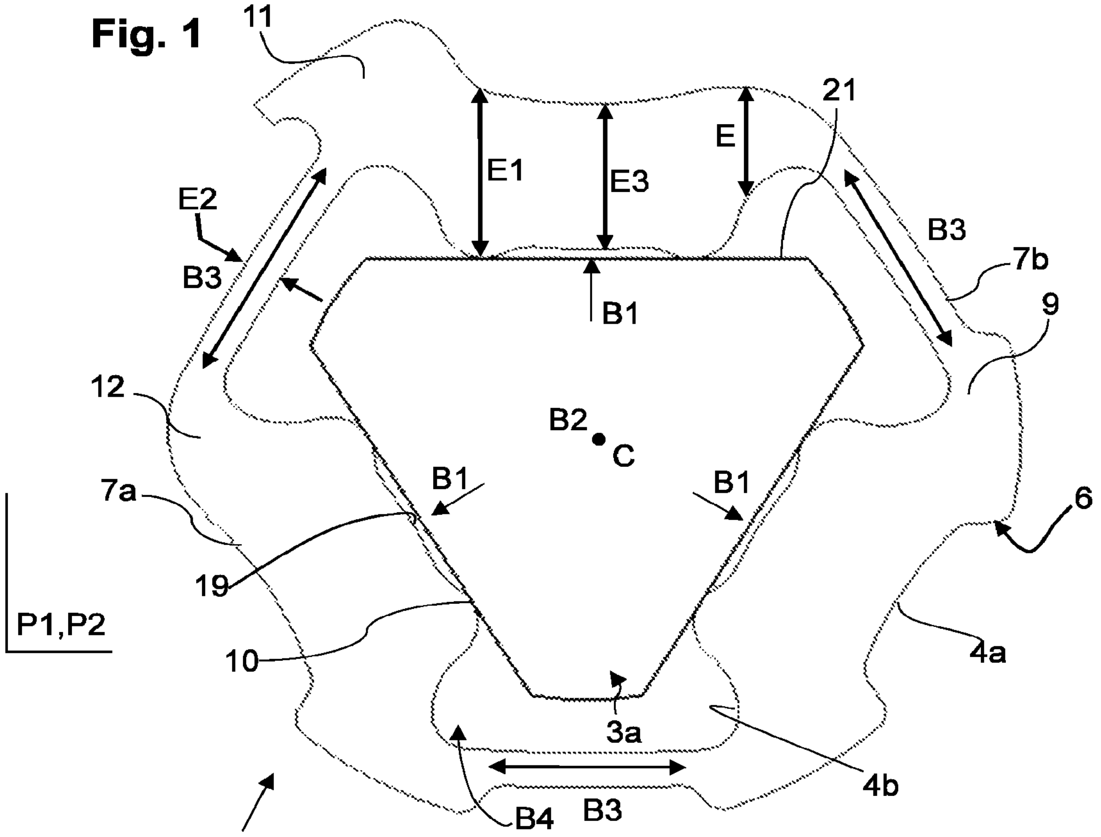
FIG. 1 is a view of an elastic holding member for fixing a timepiece component assembled to a support element such as a stub axle, according to one embodiment of the invention.
Figure 4:
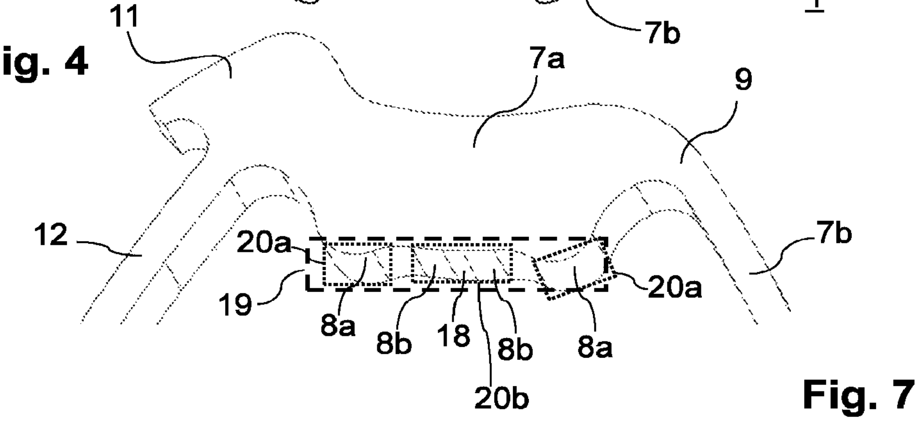
FIG. 4 shows a larger scale view of part A of FIG. 3 from another viewing angle, according to the embodiment of the invention.

Indeed, in the present embodiment and with reference to FIG. 1, the section of this support element 3*a* is non-circular, preferably mainly triangular, being formed of three essentially flat faces. In this context, the flat faces of this support element 3*a* comprise the contact portions 10 of this element 3*a*, portions 10 which are therefore also flat. With reference to FIG. 4, the connecting portion 19 of each first structural sub-element 7*a* comprises a substantially hollow or substantially concave part and two contact areas 8*a* defined at its ends and extending substantially over all or part of the thickness of the holding member 1. These two contact areas 8*a* are specifically defined so as to cooperate with the corresponding contact portions 10 comprised in the peripheral wall 21 of this support element 3*a*. Such contact areas 8*a* each have a preferably convex surface and delimit the ends of the connecting portion 19 of each first structural sub-element 7*a*. The convex surface of each of these contact areas 8*a* thus enables them to achieve with the contact portions 10 a contact configuration of the plano-convex type. It should be noted here that the flat face of each contact portion 10 of the support element 3*a* is assessed relative to the convex surface of each corresponding contact area 8*a* against which this portion 10 is arranged. In this configuration, the presence of two convex contact areas 8*a* in the connecting portion 19 of each first structural sub-element 7*a* allows to produce a contact pressure between the holding member 1 and the support element 3*a* when making a mechanical connection between them, while consequently reducing the intensity of the stresses at these contact areas 8*a* and the corresponding contact portions 10*a* of the support element 3*a* when assembling and/or fixing this holding member 1 with the support element 3*a* here the stub axle, which stresses are liable to damage the holding member 1 by the appearance of breaks/fractures or else cracks. In other words, as there is no driving of the support element 3*a*, which in this embodiment has an increasing triangular section defining a cone in the axial direction of this element 3*a* and that the connecting member 1 is simply blocked on the maximum section of this cone, the stresses are then almost zero or even zero.

Regarding the second holding part 20*b*, it also comprises at least one contact area 8*b*. This second holding part 20*b* is intended to cooperate with the peripheral wall 21 of a support element 3*b* such as the balance shaft 3*b*. Such a support element 3*b* has a cross section different from that of another support element 3*a* such as the stub axle 3*a*, the peripheral wall of which is intended to cooperate only with the first holding part 20*a* of each first structural sub-element 7*a* of the holding member 1. The difference(s) of this cross section may relate to the shape of this section but not exclusively.

It will be noted that, the shape and/or the dimensions of this section are specifically defined so that said at least one contact area 8*b* is the only contact area 8*b* of the connecting portion 19 of each first structural sub-element 7*a* which is configured to cooperate exclusively with the peripheral wall 21 of this support element 3*b*.

Figure 2:
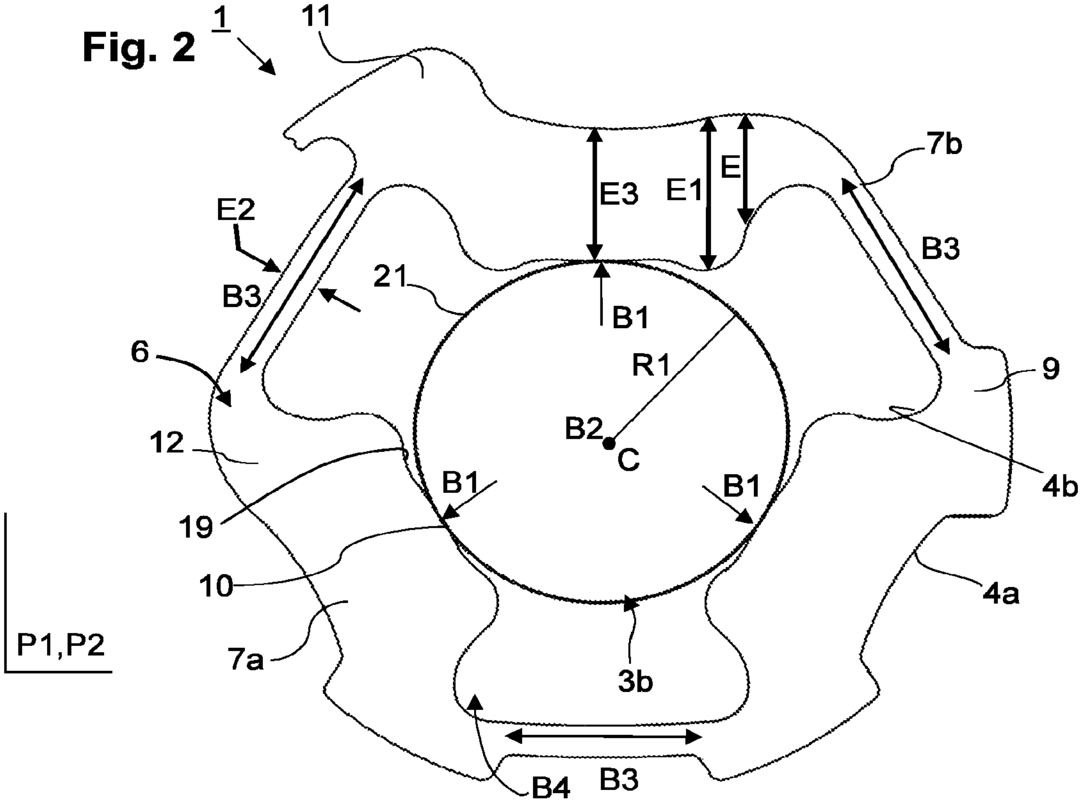
FIG. 2 is a view of an elastic holding member for fixing a timepiece component assembled to a support element such as a balance shaft, according to the embodiment of the invention.
Figure 3:
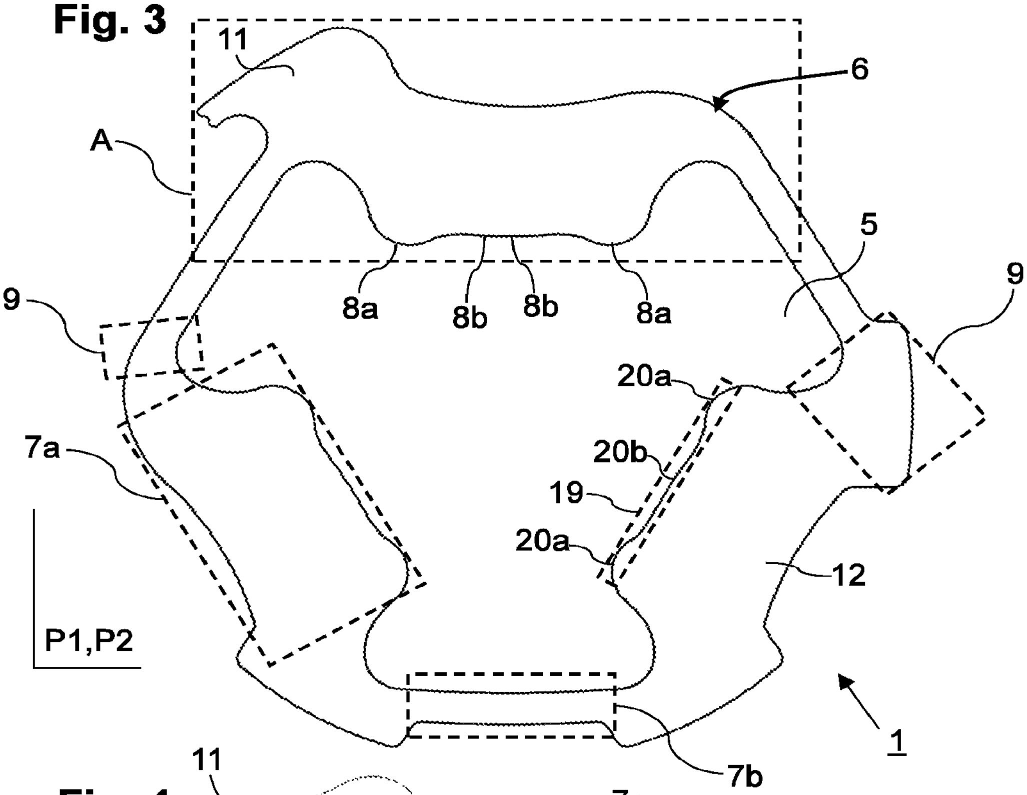
FIG. 3 is a view of the elastic holding member for fixing the timepiece component on the support element, according to the embodiment of the invention.

Indeed, in the present embodiment, with reference to FIG. 2, the section of this support element 3*b* is preferably circular. In FIG. 4, the connecting portion 19 of each first structural sub-element 7*a* comprises a substantially hollow or substantially concave part wherein two contact areas 8*b* are comprised. These two contact areas 8*b* are able to cooperate with the corresponding contact portions 10 of the support element 3*b*. Such contact areas 8*b* are defined in the connecting portion 19, in particular in the concave part of this connecting portion 19, extending substantially over all or part of the thickness of the holding member 1. In addition, these contact areas 8*b* are flat, each comprising a surface which is entirely or partly flat. In the connecting portion 19, the two contact areas 8*b* of each first structural sub-element 7*a* otherwise called flat contact areas 8*b*, are respectively comprised in different planes together forming an obtuse angle. These two contact areas 8*b* of each first structural sub-element 7*a* are separate by being spaced from each other. In other words, the connecting portion 19 comprises a separation area 18 of the two contact areas 8*b* of each first structural sub-element 7*a* visible in FIG. 4.

The contact areas 8*b* of the first structural sub-elements 7*a* are provided in particular to cooperate with the contact portions 10 according to a contact configuration of the plano-convex type in which configuration where the flat surface of each contact area 8*b* cooperates with the corresponding contact portion 10 of convex shape of the support element 3. It should be noted here that this convex shape of each contact portion 10 is assessed relative to the flat surface of each corresponding contact area 8*b* opposite which this portion 10 is arranged. It will be noted that this flat surface of each contact area 8*b* forms a plane tangent to the diameter of the support element. In other words, the flat surface is perpendicular to the diameter and therefore to the radius R1 of the support element.

In this configuration, the presence of two flat contact areas 8*b* in the connecting portion 19 of each first structural sub-element 7*a* allows to apply a contact pressure between the holding member 1 and the support element 3*b* when making a mechanical connection therebetween, while consequently reducing the intensity of the stresses at these contact areas 8*b* and the corresponding contact portions 10 of the support element 3*b* when assembling and/or fixing this holding member 1 with the support element 3*b*, which stresses are liable to damage the holding member 1 by the appearance of breaks/fractures or else cracks.

It will be noted that these two flat contact areas 8*b* are preferably distributed separately over the connecting portion 19 of each first structural sub-element 7*a*, between the two contact areas 8*a* of the first holding part 20*a*.

In a variant, the second holding part 20*b* comprises a single flat contact area 8*b* comprised on the connecting portion 19 of each first structural sub-element 7*a*, equidistantly from the two contact areas 8*a* of the first holding part 20*a*.

The holding member 1 then comprises twelve contact areas 8*a*, 8*b*, six of which referenced 8*a* are configured to cooperate exclusively with a support element 3*a*, for example of the stub axle 3*a* type in the context of classification operations, and six others with a support element 3*b*, for example of the balance shaft type, to achieve precise centring of the timepiece component 2, for example a spiral, in the horological movement 110. In this holding member 1, each first structural sub-element 7*a* has a volume or amount of material which is substantially greater or strictly greater than the volume or amount of material constituting each second structural sub-element 7*b*. It will indeed be noted that the outer and inner peripheral walls 4*a*, 4*b* are separated from one another in this holding member 1 by a variable distance E which then changes depending on whether these peripheral walls 4*a*, 4*b* are comprised, for example, in a first structural sub-element 7*a* or else a second structural sub-element 7*b*. Indeed, this distance E is a maximum distance E1 when it is defined between parts of the inner and outer peripheral walls comprised in each first structural sub-element 7*a*, that is to say the maximum distance E1 present between the inner and outer faces of this first structural sub-element 7*a*. In particular, for each first structural sub-element 7*a*, this maximum distance E1 is defined between a part of the outer peripheral wall of this first structural sub-element 7*a* and each contact area 8*a* dedicated to cooperating with the peripheral wall 21 of the support element 3*b* such as the stub axle, this contact area 8*a* being comprised in the inner face of the inner peripheral wall of this first structural sub-element 7*a*. It will also be noted that this maximum distance E1 is greater than a distance E3 defined between a part of the outer peripheral wall of the first structural sub-element 7*a* and each contact area 8*b* dedicated to cooperating with the peripheral wall 21 of the support element 3*b* such as the balance shaft 3*b*, this contact area 8*b* being comprised in the inner face of the inner peripheral wall 4*b* of this first structural sub-element 7*a*.

Moreover, this distance E is a minimum distance E2 when it is defined between parts of the outer and inner peripheral walls 4*a*, 4*b* comprised in the second structural sub-elements 7*b*, or the minimum distance E2 present between the inner and outer faces of this second structural sub-element 7*b*. Such a minimum distance E2 is constant or substantially constant over the entire length over which these second structural sub-elements 7*b* extend. This length is here parallel or substantially parallel to the outer and inner peripheral walls 4*a*, 4*b* comprised in these second structural sub-elements 7*b*. In addition, the distance E2 is in this holding member 1, less than the smallest distance defined in the first structural sub-element 7*a*. In other words, the distance E2 is the smallest distance that is defined between the outer and inner peripheral walls 4*a*, 4*b* of this holding member 1.

It is therefore understood here that each second structural sub-element 7*b* has a cross section which is smaller than a cross section of each first structural sub-element 7*a*. In other words, the cross section of each second structural sub-element 7*b* has an area which is less than an area of the cross section of each first structural sub-element 7*a*. Note that the cross section of the second structural sub-element 7*b* is constant or substantially constant throughout the body of this second structural sub-element 7*b* while the cross section of the first structural sub-element 7*a* is inconstant/variable throughout the body of this first structural sub-element 7*a*. In addition, it will be noted that:

- the cross section of each first structural sub-element 7*a* is preferably a solid or partially solid section which is perpendicular to the longitudinal direction wherein the body of this first structural sub-element 7*a* extends, and
- the cross section of each second structural sub-element 7*b* is preferably a solid or partially solid section which is perpendicular to the longitudinal direction along which the body of this second structural sub-element 7*b* extends.

Such a configuration of the first structural sub-elements and of the second structural sub-elements 7*a*, 7*b* allows the holding member 1 to store a greater amount of elastic energy for the same clamping compared with the holding members of the prior art. Such an amount of elastic energy stored in the holding member 1 then allows to obtain a greater holding torque of the holding member on the support element 3*a*, 3*b* in the assemblage 130*a*, 130*b* of the holding member-timepiece component assembly 120 with this support element 3*a*, 3*b*. In other words, such an excess of elastic energy stored in the holding member 1 therefore increases the holding torque and allows optimum elastic clamping. In addition, it should be noted that such a configuration of the holding member 1 allows to store elastic energy ratios which are 6 to 8 times greater than those of the holding members of the prior art.

It will be noted that the arrangement of the first structural sub-elements and these second structural sub-elements 7*a*, 7*b* in the holding member 1 allows, during an insertion with clamping, a deformation of each second structural sub-element 7*b* allowing to accommodate the deformation of the assembly of the holding member 1 with the geometry of the connecting part of the support element 3*a*, 3*b* on which it is assembled. In addition, the mode of deformation that each second structural sub-element 7*b* undergoes is a toroidal torsion coupled with a radial expansion.

Figure 7:
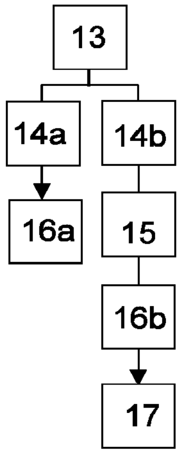
FIG. 7 shows a method for producing such assemblages of an elastic holding member-timepiece component assembly with a support element of the stub axle or balance shaft type.

With reference to FIG. 7, the invention also relates to a method for producing the assemblage 130*a*, 130*b* of the elastic holding member-timepiece component assembly 120 with the support element 3*a*, 3*b* for example the balance shaft 3*b* or the stub axle 3*a*. This method comprises a step 13 of mounting the support element 3*a*, 3*b* on the holding member 1. During this step 13, the support element 3*a*, 3*b* is inserted into the opening 5 of the holding member 1 more precisely the end of this support element 3*a*, 3*b* is presented at the entrance of this opening 5 defined by the inner peripheral wall 4*b* of the holding member 1 in anticipation of the introduction of the connecting part of this support element 3*a*, 3*b* in the volume defined in this opening 5.

When it comes to the assemblage 130*a* of elastic holding member-timepiece component the assembly 120 with the support element 3*a* such as a stub axle 3*a*, this step 13 comprises a fitting sub-step 14*a* during which the collet is placed on this stub axle 3*a* in anticipation, for example, of performing the classification operation. This step 13 also comprises a sub-step 16*a* of coupling this holding member 1 with the support element 3*a* here the stub axle 3*a*. During this sub-step 16*a*, the coupling is carried out without elastic clamping, thanks to the complementarity of their shape which thus allows cooperation between the latter when they are rotated when performing the classification operation. It will be noted that this complementarity of their shape results in particular from the fact that this holding member 1 and the support element 3*a* have different shapes. In addition, during this mounting step 13 only the contact areas referenced 8*a* cooperate with the portions 10 of the peripheral wall 21 of the connecting part of the support element 3*a*.

When it comes to the assemblage 130*b* of the elastic holding member-timepiece component assembly 120 with the support element 3*b* such as a balance shaft 3*b*, this step 13 comprises a sub-step of elastic deformation 14*b* of the holding member 1 in particular of a central area of this holding member 1, the contour of which comprises said opening 5, which deformation resulting from the application of a contact force on the contact areas 8*b* of the first structural sub-elements 7*a* by the portions 10 of the peripheral wall 21 of the connecting part of the support element 3*b*.

As previously mentioned, this elastic deformation of the holding member 1 results from the application of the contact force on the contact areas 8*b* of the first structural sub-elements 7*a* by the portions 10 of the peripheral wall 21 of the support element 3*b*. Such a deformation sub-step 14*b* comprises a phase of displacement 15 of the first structural sub-elements 7*a* under the action of the contact force applied thereto. Such a displacement of the first structural sub-elements 7*a* is carried out in a direction comprised between a radial direction B1 relative to a central axis C which is common to the support element 3*b* and to the holding member 1, and a direction B2 combined with this central axis C. It will be noted that this direction B2 is perpendicular to the direction B1 and is oriented in a defined direction from the lower face 12 towards the upper face. The contact force is preferably perpendicular or substantially perpendicular to each contact area 8*b*.

It will be noted that in the context of the embodiment of the holding member 1 described and illustrated in FIGS. 1 to 4, during the progress of this phase 15, the first structural sub-elements 7*a* thus displacing under the action of this contact force, generate a double elastic deformation of the second structural sub-elements 7*b*.

A first deformation otherwise called "torsional elastic deformation" of these second structural sub-elements 7*b*. During this torsional deformation, each second structural sub-element 7*b* is driven at its two ends in the same direction of rotation B4 by the first displacing structural sub-elements 7*a* to which such ends are connected. It will be noted that only part of the body of these second structural sub-elements 7*b* is torsionally deformable here the ends of these second structural sub-elements 7*b*. Such a first deformation contributes in particular to then causing a torsional deformation of each structural element 6. This first deformation allows to improve the insertion of the support element 3*b* into the opening 5 of the holding member 1 while helping to prevent any breakage of the holding member 1 and/or any appearance of a crack in this member 1 during its assemblage with the support element 3*b*.

A second deformation otherwise called "tension deformation" or else "elastic extension deformation" of the second structural sub-elements 7*b*. During this extension deformation, each second structural sub-element 7*b* is pulled at its two ends in the longitudinal direction B3 in opposite directions by the first displacing structural sub-elements 7*a* to which such ends are connected. Such a second deformation of the second structural sub-element 7*b* contributes in particular to the fact that each structural element 6 stores a large amount of elastic energy. In other words, the support element 1 also stores a large amount of elastic energy This double elastic deformation of the second structural sub-elements 7*b* can be carried out simultaneously or substantially simultaneously, or alternatively successively or substantially successively. It will be noted in the context of the implementation of this phase 15, when this double elastic deformation is carried out successively or substantially successively, the first deformation is then carried out before the second deformation.

This mounting step 13 then comprises a sub-step 16*b* of fixing the holding member 1 on the support element 3*b*. Such a fixing sub-step 16*b* comprises a phase 17 of performing a radial elastic clamping of the holding member 1 on the support element 3*b*. It is therefore understood that in such a state of stress, the holding member 1 stores a large amount of elastic energy which contributes to giving it a substantial holding torque, in particular allowing optimum twisting by elastic clamping.

The invention claimed is:

1. An elastic holding member for fixing a timepiece component on support elements of different cross section, comprising:

- an opening into which each support element can be inserted;
- structural elements together forming a body configured to ensure mounting of each support element in the opening, each of the structural elements comprising a first structural sub-element and a second structural sub-element, the first structural sub-element including a volume of material greater than a volume of material constituting the second structural sub-element; and
- a connecting portion configured for mounting of each of the support elements in the holding member, the portion being defined on an inner face of the first structural sub-element and having first and second holding parts, the first holding part having two curved contact areas each configured to contact at least one of the support elements and the second holding part having a flat contact area disposed between the two curved contact areas and configured to contact at least one of the support elements.

2. The elastic holding member according to claim 1, wherein the connecting portion is defined only on the inner face of the first structural sub-element.

3. The elastic holding member according to claim 1, wherein the connecting portion comprises the first and second holding parts configured for mounting each of the support elements in the holding member.

4. The elastic holding member according to claim 1, wherein each contact area of the first and second holding parts is comprised in the connecting portion of each first structural sub-element of the holding member extending over all or part of a thickness of the holding member.

5. The elastic holding member according to claim 1, wherein each contact area of the first and second holding parts is configured to cooperate with a corresponding contact portion of a corresponding support element by being in a contact configuration of a plano-convex type.

6. The elastic holding member according to claim 1, wherein the curved contact areas of the first holding part comprise two convex contact areas defining a first connecting portion of each first structural sub-element.

7. The elastic holding member according to claim 6, wherein the second holding part comprises two flat contact areas distributed disjointly over a second connecting portion of each first structural sub-element between the two convex contact areas of the first holding part.

8. The elastic holding member according to claim 6, wherein the second holding part comprises a single flat contact area arranged equidistant from the two convex contact areas of the first holding part.

9. The elastic holding member according to claim 1, wherein the second holding part comprises two flat contact areas respectively comprised in different planes together forming an obtuse angle.

10. The elastic holding member according to claim 1, comprising as many first structural sub-elements as second structural sub-elements.

11. The elastic holding member according to claim 1, wherein the first structural sub-elements and the second structural sub-elements are arranged successively and alternately in the holding member.

12. The elastic holding member according to claim 1, wherein each first structural sub-element comprises two opposite ends connected to two different second structural sub-elements.

13. The elastic holding member according to claim 1, wherein each second structural sub-element has a cross section which is smaller than a cross section of each first structural sub-element.

14. The elastic holding member according to claim 1, wherein each second structural sub-element has a cross section which is constant throughout a body of the second structural sub-element.

15. The elastic holding member according to claim 1, comprising a point of attachment with the timepiece component.

16. The elastic holding member according to claim 1, wherein the holding member comprises a collet for fixing the timepiece component to one of the support elements.

17. The elastic holding member according to claim 1, wherein the holding member is made of a micromachinable material comprising silicon, quartz, corundum, silicon and silicon dioxide, DLC, metallic glass, ceramic, or an at least partially amorphous material.

18. An elastic holding member-timepiece component assembly for a horological movement of a timepiece comprising a holding member according to claim 1.

19. The assembly according to claim 18, wherein the assembly is made in one piece.

20. An assemblage comprising an elastic holding member-timepiece component assembly according to claim 18 and one of the support elements, the assembly being held on the one support element from the first holding part of the holding member, the first holding part being configured to cooperate with a peripheral wall of the one support element.

21. An assemblage comprising an elastic holding member-timepiece component assembly according to claim 18 and one of the support elements, the assembly being held on the one support element from the second holding part of the holding member, the second holding part being configured to cooperate with a peripheral wall of the one support element.

22. A horological movement comprising at least one assemblage comprising an elastic holding member-timepiece component assembly having a holding member according to claim 1 and one of the support elements, the assembly being held on the one support element from the second holding part of the holding member, the second holding part being configured to cooperate with a peripheral wall of the one support element.

23. A timepiece comprising a horological movement according to claim 22.

24. The elastic holding member according to claim 1, wherein first and second contact areas are configured such that:

- the first contact areas but not the second contact area directly contact a first one of the support elements having a first shape, and
- the second contact area but not the first contact areas directly contact a second one of the support elements having a second shape different from the first shape.

25. An elastic holding member for fixing a timepiece component on support elements of different cross section, comprising:

- an opening into which each support element can be inserted;
- structural elements together forming a body configured to ensure mounting of each support element in the opening, each of the structural elements comprising a first structural sub-element and a second structural sub-element, the first structural sub-element including a volume of material greater than a volume of material constituting the second structural sub-element; and
- a connecting portion configured for mounting of each of the support elements in the holding member, the portion being defined on an inner face of the first structural sub-element and comprising first and second holding parts, the first holding part comprising two convex contact areas defining a first connecting portion of each first structural sub-element, and the second holding part comprises two flat contact areas distributed disjointly over a second connecting portion of each first structural sub-element between the two convex contact areas of the first holding part.

26. An elastic holding member for fixing a timepiece component on support elements of different cross section, comprising:

- an opening into which each support element can be inserted;
- structural elements together forming a body configured to ensure mounting of each support element in the opening, each of the structural elements comprising a first structural sub-element and a second structural sub-element, the first structural sub-element including a volume of material greater than a volume of material constituting the second structural sub-element; and
- a connecting portion configured for mounting of each of the support elements in the holding member, the portion being defined on an inner face of the first structural sub-element and comprising first and second holding parts, the first holding part comprising two convex contact areas defining a first connecting portion of each first structural sub-element, and the second holding part comprising a single flat contact area arranged equidistant from the two convex contact areas of the first holding part.

* * * * *